US012675965B1

(12) United States Patent
Mulla et al.

(10) Patent No.: US 12,675,965 B1
(45) Date of Patent: Jul. 7, 2026

(54) TECHNIQUES FOR ALIGNING VISUAL CONTENT TO THREE-DIMENSIONAL SIGNALS

(71) Applicant: LUMANA INC., Sunnyvale, CA (US)

(72) Inventors: Ofir Mulla, Talme Elazar (IL); Aviad Zabatani, Kfar Vitkin (IL); Ron Kimmel, Haifa (IL); Sagi Ben Moshe, Ein Ayala (IL)

(73) Assignee: LUMANA INC., Sunnyvale, CA (US)

( * ) Notice: Subject to any disclaimer, the term of this patent is extended or adjusted under 35 U.S.C. 154(b) by 0 days.

(21) Appl. No.: 19/434,372

(22) Filed: Dec. 29, 2025

(51) Int. Cl.
| | |
|---|---|
| *G06V 10/24* | (2022.01) |
| *G06T 3/02* | (2024.01) |
| *G06T 7/20* | (2017.01) |
| *G06V 10/764* | (2022.01) |
| *G06V 20/52* | (2022.01) |
| *G06V 40/20* | (2022.01) |

(52) U.S. Cl.
CPC .............. *G06V 10/247* (2022.01); *G06T 3/02* (2024.01); *G06T 7/20* (2013.01); *G06V 10/764* (2022.01); *G06V 20/52* (2022.01); *G06V 40/20* (2022.01); *G06V 2201/07* (2022.01)

(58) Field of Classification Search
CPC .... G06V 10/247; G06V 10/764; G06V 20/52; G06V 40/20; G06V 2201/07; G06T 3/02; G06T 7/20
See application file for complete search history.

(56) References Cited

U.S. PATENT DOCUMENTS

| | | | |
|---|---|---|---|
| 2011/0228987 A1* | 9/2011 | Iwasaki ................... | G06T 7/215 382/107 |
| 2012/0126973 A1* | 5/2012 | DeAngelis ......... | A63B 24/0062 340/539.13 |

(Continued)

FOREIGN PATENT DOCUMENTS

| | | | |
|---|---|---|---|
| CN | 109031381 A | * 12/2018 | ............. G01C 21/10 |

OTHER PUBLICATIONS

Ishige et al., "Opt-in Camera: Person Identification in Video via UWB Localization and Its Application to Opt-in Systems," 2025 IEEE/RSJ International Conference on Intelligent Robots and Systems (IROS), Hangzhou, China, 2025, pp. 20562-20569, doi: 10.1109/IROS60139.2025.11247671. (Year: 2025).*

(Continued)

*Primary Examiner* — Ming Y Hon
*Assistant Examiner* — Julia Z. Yao
(74) *Attorney, Agent, or Firm* — M&B IP Analysts, LLC

(57) ABSTRACT

A system and method for visual content alignment. A method includes identifying subjects in visual content, wherein the visual content is captured by a camera deployed at a site, wherein a position sensor is deployed with a target subject among the subjects, wherein the position sensor captures signals representing positions of the target subject at the site; transforming points representing the positions of the target subject from a first feature space to a second feature space, wherein the first feature space is a feature space of the signals, wherein the second feature space is a feature space of the visual content; and mapping the positions of the target subject represented by the signals to positions within the visual content based on the points in the second feature space.

15 Claims, 4 Drawing Sheets

(56) References Cited

U.S. PATENT DOCUMENTS

| | | | | |
|---|---|---|---|---|
| 2014/0140575 | A1* | 5/2014 | Wolf | G06V 10/25 |
| | | | | 382/103 |
| 2014/0266860 | A1* | 9/2014 | Blumrosen | G01S 15/66 |
| | | | | 367/87 |
| 2015/0346701 | A1* | 12/2015 | Gordon | G05B 15/02 |
| | | | | 700/275 |
| 2017/0276480 | A1* | 9/2017 | Hedley | G01S 5/0289 |
| 2018/0374222 | A1* | 12/2018 | Kobayashi | A63F 13/213 |
| 2021/0124953 | A1* | 4/2021 | Mirza | G06Q 30/0633 |
| 2021/0133482 | A1* | 5/2021 | Kohler | G06N 3/0464 |
| 2021/0304577 | A1* | 9/2021 | Hollar | G06V 40/103 |
| 2022/0334243 | A1* | 10/2022 | DeAngelus | G06V 10/454 |
| 2023/0043103 | A1* | 2/2023 | Pritchett | G06T 7/246 |
| 2023/0285080 | A1* | 9/2023 | Hladio | A61B 5/4528 |

OTHER PUBLICATIONS

Maruhashi et al. 2012. A method for identification of moving objects by integrative use of a camera and accelerometers. In Proceedings of the 27th Annual ACM Symposium on Applied Computing (SAC '12). Association for Computing Machinery, New York, NY, USA, 1-6. https://doi.org/10.1145/2245276.2245278 (Year: 2012).*

Huang et al., "A Novel LiDAR—Camera Fused Player Tracking System in Soccer Scenarios," in IEEE Sensors Journal, vol. 24, No. 9 , pp. 15630-15642, 1 May 1, 2024, doi: 10.1109/JSEN.2024. 3379990. (Year: 2024).*

Vleuguels et al. Ultra-Wideband Indoor Positioning and IMU-Based Activity Recognition for Ice Hockey Analytics. Sensors. 2021; 21(14):4650. https://doi.org/10.3390/s21144650 (Year: 2021).*

Umek et al. Validation of UWB positioning systems for player tracking in tennis. Pers Ubiquit Comput 26, 1023-1033 (2022). https://doi.org/10.1007/s00779-020-01486-0 (Year: 2022).*

Mu et al. Indoor Pedestrian Positioning Method Based on Ultra-Wideband with a Graph Convolutional Network and Visual Fusion. Sensors. 2024; 24(20):6732. https://doi.org/10.3390/s24206732 (Year: 2024).*

Tavanti et al., "Review on Systems Combining Computer Vision and Radio Frequency Identification," in IEEE Internet of Things Journal, vol. 12, No. 2, pp. 1291-1319, 15 Jan. 15, 2025, doi: 10.1109/JIOT.2024.3484755 (Year: 2025).*

Grzechca et al., "The Positioning Accuracy Based on the UWB Technology for an Object on Circular Trajectory," Intl Journal of Electronics and Telecommunications, 2018, vol. 64, No. 4, pp. 487-494. doi: 10.24425/123550 (Year: 2018).*

FIFA.com, "Semi-automated offside technology" (updated Jul. 17, 2023) (available at https://inside.fifa.com/innovation/world-cup-2022/semi-automated-offside-technology).

Kinexon Sports, "Kinexon Perform LPS" (available at https://kinexon-sports.com/products/perform-lps/) (last accessed Dec. 17, 2025, at 4:05 PM Eastern).

Kinexon Sports, "Player Tracking" (available at https://kinexon-sports.com/technology/player-tracking/) (last accessed Dec. 17, 2025, at 4:05 PM Eastern).

* cited by examiner

100

125

120

110

110

Network

User Device
140

Alignment
System
130

TECHNIQUES FOR ALIGNING VISUAL CONTENT TO THREE-DIMENSIONAL SIGNALS

TECHNICAL FIELD

The present disclosure relates generally to aligning visual content with sensor data, and more specifically to aligning visual content with respect to targets moving in three-dimensional space.

BACKGROUND

Modern computing systems increasingly utilize sensor devices to capture information about physical environments. Such sensors may generate electrical or digital signals that correspond to spatial, temporal, or physical characteristics, including position, intensity, motion, or other measurable phenomena. Sensors in forms such as tags may be deployed within an environment in order to track movements or other signals related to objects or entities (for example, humans, animals, etc.) moving within the environment.

Mapping sensor signals to image data may involve transforming raw or intermediate sensor outputs into structured pixel-based representations. This transformation may include operations such as signal normalization, coordinate mapping, sampling, interpolation, and encoding into one or more image formats. The resulting image data can be used by a variety of systems, including display devices, image processing pipelines, and machine learning or computer vision frameworks.

Mapping sensor signals to image data can present a variety of technical challenges depending on the use case. For example, such mappings may face challenges with signal variability and noise. Sensor outputs may be affected by environmental conditions, hardware limitations, or interference, which can introduce noise that may cause resulting mappings to be inaccurate.

Another technical challenge in mapping sensor signals to image data is spatial and temporal alignment. Sensor signals may not inherently correspond directly to particular pixels or other portions of visual content. Aligning sensor signals to image data therefore requires additional processing, and misalignment may result in decreasing the accuracy of the mapping between sensor signals and visual content.

Such signal-to-image mappings are employed across diverse technical domains, including remote sensing, medical imaging, industrial inspection, robotics, and human-computer interaction. As sensor technologies and processing capabilities continue to evolve, techniques for converting sensor signals into image data remain an important area of ongoing technical development. It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method. The method comprises: identifying a plurality of subjects in visual content, wherein the visual content is captured by a camera deployed at a site, wherein a position sensor is deployed with a target subject among the plurality of subjects, wherein the position sensor captures a plurality of signals representing a plurality of positions of the target subject at the site; transforming a plurality of points representing the plurality of positions of the target subject from a first feature space to a second feature space, wherein the first feature space is a feature space of the plurality of signals, wherein the second feature space is a feature space of the visual content; and mapping the plurality of positions of the target subject represented by the plurality of signals to a plurality of positions within the visual content based on the plurality of points in the second feature space.

Certain embodiments disclosed herein also include a non-transitory computer-readable medium having stored thereon causing a processing circuitry to execute a process, the process comprising: identifying a plurality of subjects in visual content, wherein the visual content is captured by a camera deployed at a site, wherein a position sensor is deployed with a target subject among the plurality of subjects, wherein the position sensor captures a plurality of signals representing a plurality of positions of the target subject at the site; transforming a plurality of points representing the plurality of positions of the target subject from a first feature space to a second feature space, wherein the first feature space is a feature space of the plurality of signals, wherein the second feature space is a feature space of the visual content; and mapping the plurality of positions of the target subject represented by the plurality of signals to a plurality of positions within the visual content based on the plurality of points in the second feature space.

Certain embodiments disclosed herein also include a system. The system comprises: a processing circuitry; and a memory, the memory containing instructions that, when executed by the processing circuitry, configure the system to: identify a plurality of subjects in visual content, wherein the visual content is captured by a camera deployed at a site, wherein a position sensor is deployed with a target subject among the plurality of subjects, wherein the position sensor captures a plurality of signals representing a plurality of positions of the target subject at the site; transform a plurality of points representing the plurality of positions of the target subject from a first feature space to a second feature space, wherein the first feature space is a feature space of the plurality of signals, wherein the second feature space is a feature space of the visual content; and map the plurality of positions of the target subject represented by the plurality of signals to a plurality of positions within the visual content based on the plurality of points in the second feature space.

Certain embodiments disclosed herein include a method, non-transitory computer-readable medium, or system as noted above or below, further comprising or being configured to perform a process in accordance with the following features: wherein the plurality of points is transformed using a transformation which preserves lines and parallelism.

Certain embodiments disclosed herein include a method, non-transitory computer-readable medium, or system as noted above or below, further comprising or being configured to perform a process in accordance with the following features: wherein the transformation is an affine transformation.

Certain embodiments disclosed herein include a method, non-transitory computer-readable medium, or system as noted above or below, further comprising or being configured to perform a process in accordance with the following features: wherein transforming the plurality of points further comprises: solving for an affine value, wherein the plurality of points is transformed based on the affine value.

Certain embodiments disclosed herein include a method, non-transitory computer-readable medium, or system as noted above or below, further comprising or being configured to perform a process in accordance with the following features: wherein the plurality of points representing the plurality of positions of the target subject in the first feature space form a curve, wherein transforming the plurality of points further comprises: classifying a plurality of portions of the curve into a plurality of classifications, wherein the plurality of points is transformed based on the plurality of classifications.

Certain embodiments disclosed herein include a method, non-transitory computer-readable medium, or system as noted above or below, further comprising or being configured to perform a process in accordance with the following features: wherein the visual content includes a plurality of visual content items, wherein mapping the plurality of positions of the target subject represented by the plurality of signals to the plurality of positions within the visual content further comprises: determining a set of visual content coordinates for each of the plurality of positions, wherein the set of visual content coordinates of each position is defined with respect to a portion of a visual content item among the plurality of visual content items.

Certain embodiments disclosed herein include a method, non-transitory computer-readable medium, or system as noted above or below, further comprising or being configured to perform a process in accordance with the following features: identifying an interaction between the target subject and another subject of the plurality of subjects shown in the visual content, wherein the interaction is identified with respect to a position among the plurality of positions represented by the plurality of signals.

Certain embodiments disclosed herein include a method, non-transitory computer-readable medium, or system as noted above or below, further comprising or being configured to perform a process in accordance with the following features: wherein the interaction is identified based on a distance between the target subject and the other subject below a threshold.

Certain embodiments disclosed herein include a method, non-transitory computer-readable medium, or system as noted above or below, further comprising or being configured to perform a process in accordance with the following features: wherein the visual content includes a plurality of visual content items, further comprising: identifying the target subject in at least one visual content item of the plurality of visual content items, wherein the interaction is identified based on the at least one visual content item.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

Figure 1:
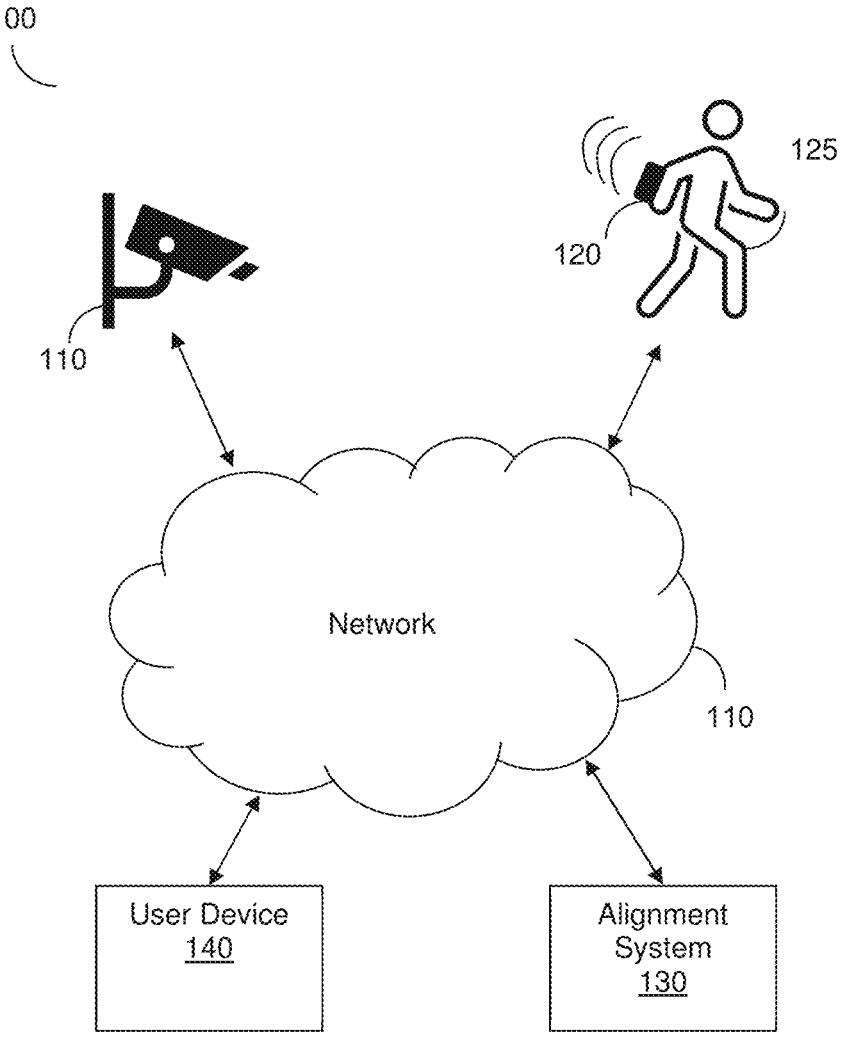

FIG. 1 is a network diagram utilized to describe various disclosed embodiments.

Figure 2:
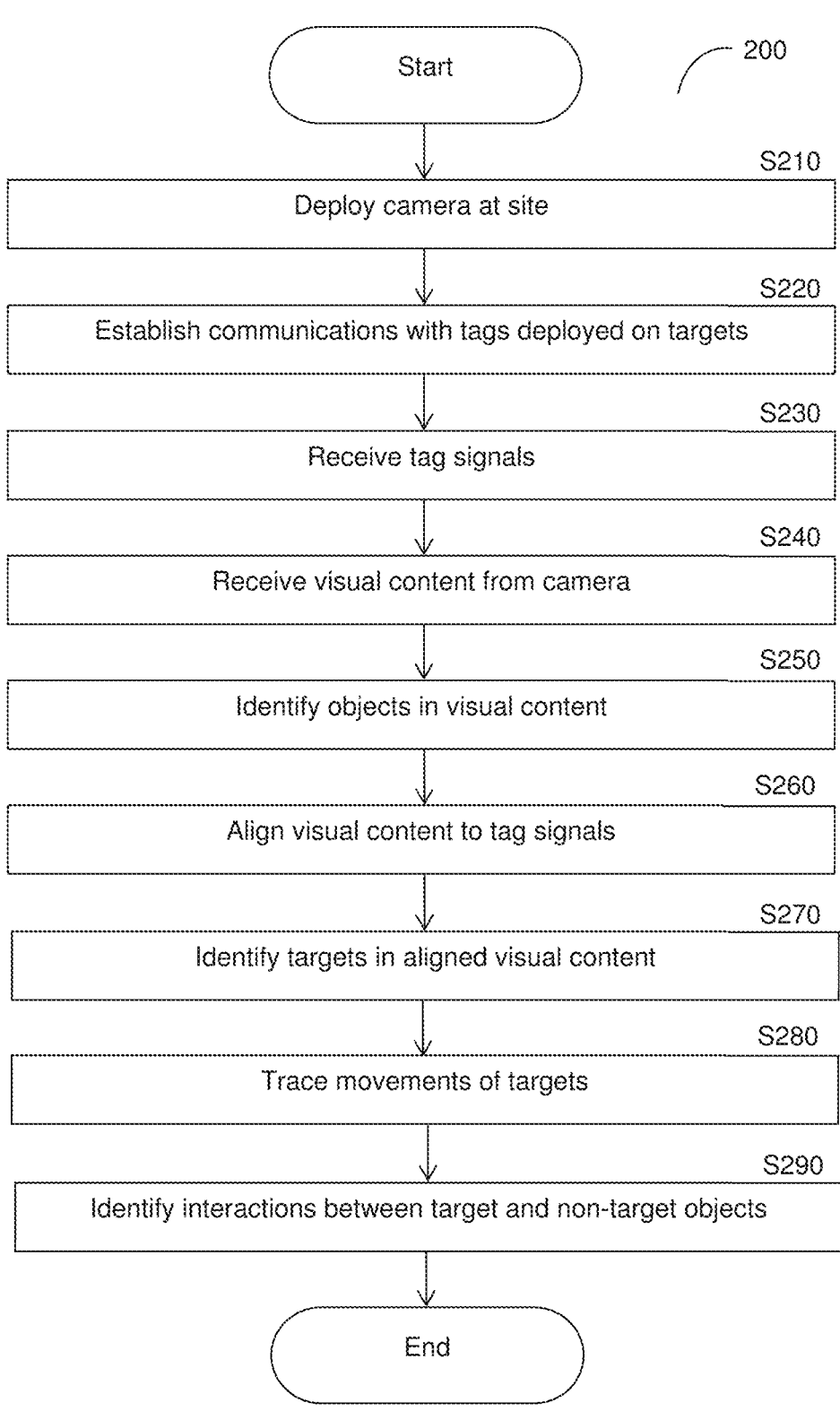

FIG. 2 is a flowchart illustrating a method for identifying activities of targets using alignment according to an embodiment.

Figure 3:
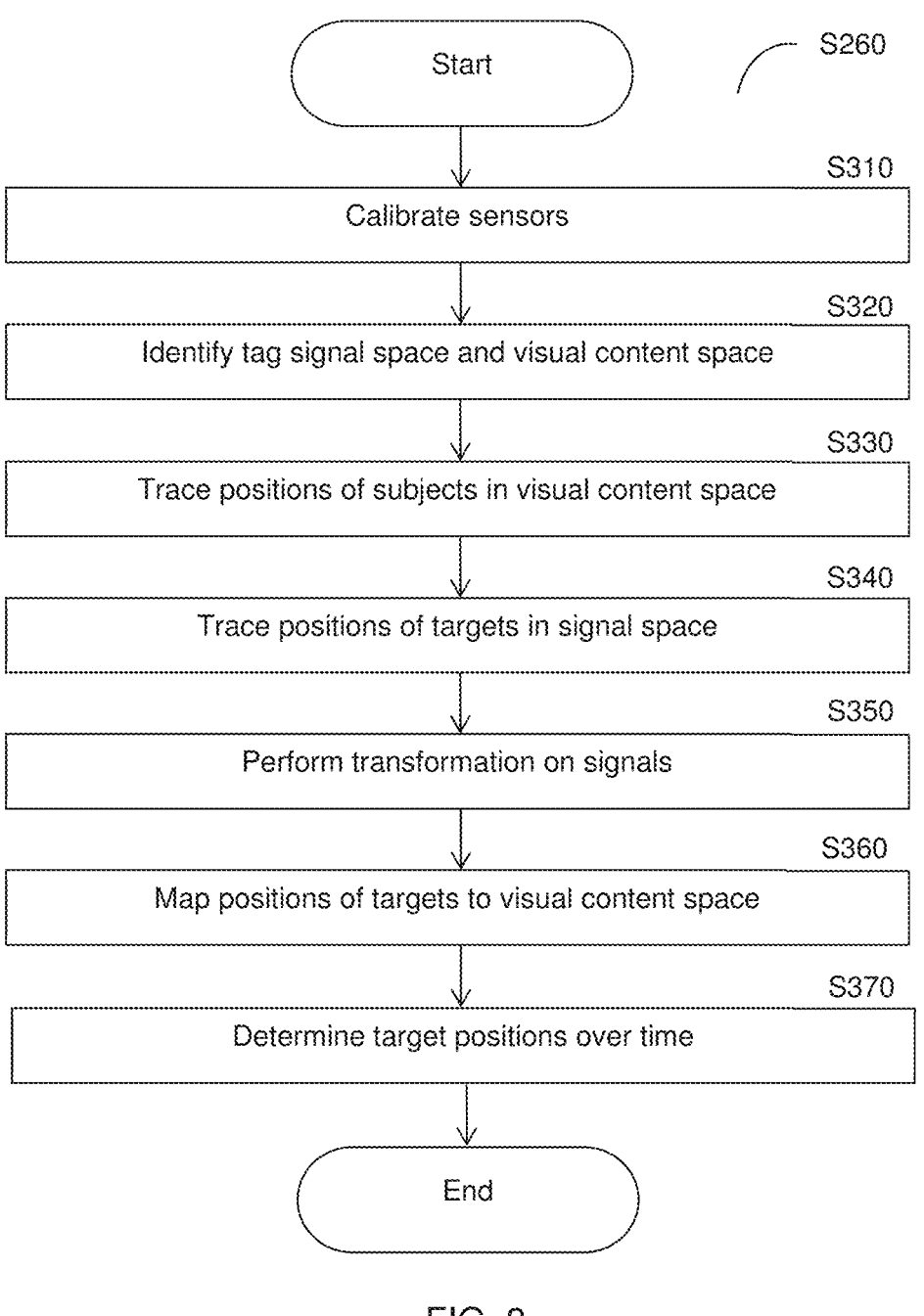

FIG. 3 is a flowchart illustrating a method for aligning visual content to tag signal data according to an embodiment.

Figure 4:
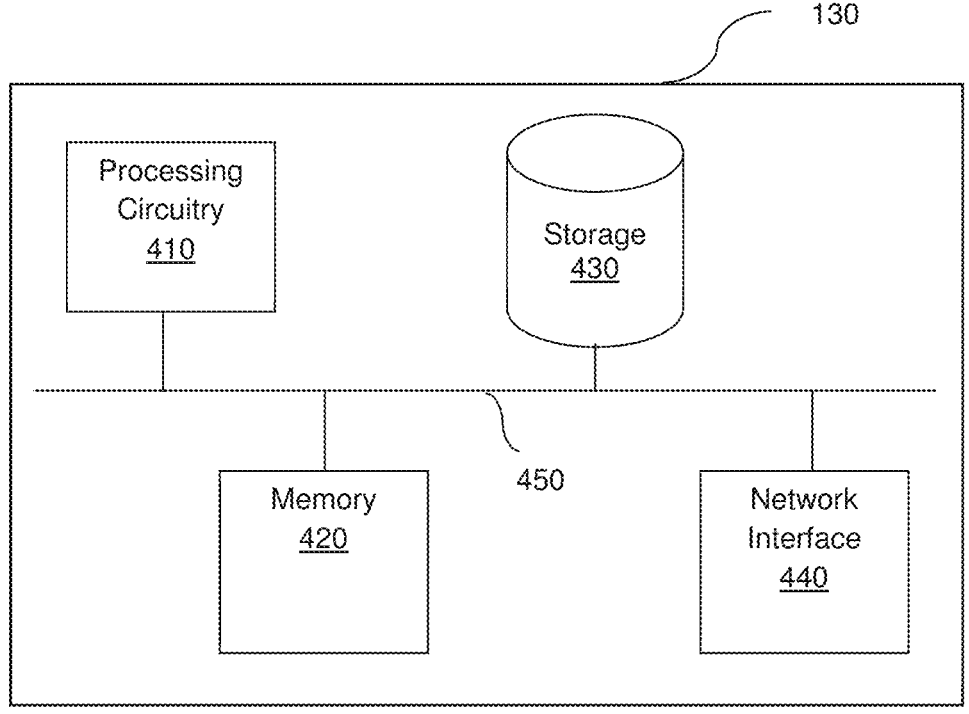

FIG. 4 is a schematic diagram of an alignment system according to an embodiment.

DETAILED DESCRIPTION

The various disclosed embodiments include methods and systems for aligning visual content to three-dimensional (3D) signal data such as signals captured by tag sensors deployed at a site where one or more targets are located. Such tag sensors may be affixed to or otherwise deployed with corresponding targets such that data from a given tag represents movements and positions of the corresponding target in 3D space. The disclosed embodiments allow for aligning visual content such as images or video showing the site with the tag sensor data in order to trace movements of the targets within the visual content. Once movements of the targets are traced, positions of the targets may be correlated with the visual content in order to identify interactions between targets and other objects or entities shown in the visual content.

Various disclosed embodiments transform points in a first space to points in a second space. The first space is defined based on tag sensor data such as positions within a 3D environment, and the second space is defined based on visual content such that points of the second space represent locations shown in the visual content. In an embodiment, an affine transformation is used to transform the points in the first space to points in the second space. Once the points of the tag sensor data have been transformed to points defined with respect to the visual content, targets wearing the tag sensors may be identified within the visual content by correlating the points of the tag sensor data to points within the visual content.

When targets have been identified within the visual content, activities of the targets may be tracked with respect to the visual content. Such activities may include, but are not limited to, movements, actions (for example, gestures), proximity (for example, becoming proximate to a non-target entity or object shown in the visual content), combinations thereof, and the like.

In this regard, it is noted that the disclosed embodiments may be utilized to track and identify how targets move and interact with their environment. As a non-limiting example, tags may be deployed with human targets such that the tag sensor data represents positions of those targets as they move within a site. By mapping the tag sensor data to visual content showing the site, positions of the target humans may be traced over time. Interactions with non-target humans at the site may be analyzed, for example by determining how close the target humans get to non-target humans. This may allow for determining whether and when targets are interacting with non-targets (i.e., assuming that a target is interacting with a non-target when the target is within a threshold distance of the non-target). For example, when the targets are waitstaff at a restaurant, interactions of the targets may be monitored in order to determine when the targets interact with non-target guests of the restaurant.

In an embodiment, the transformation used to align the tag signals with the visual content is an affine transformation. Such an affine transformation is a transformation which preserves lines and parallelism, but not necessarily Euclidean distances and angles.

The disclosed embodiments allow for mapping sensor data to visual content automatically and without necessarily requiring calibration in order to effectively perform such mapping. Moreover, the affine transformation utilized in accordance with various disclosed embodiments is a less computationally intensive transformation than other transformations which may be utilized to transform tag sensor data into other spaces such as projective or perspective transforms. Accordingly, it has been identified that using affine transformations allows for mapping tag sensor data to images in a computationally efficient manner which conserves computing resources.

FIG. 1 shows an example network diagram 100 utilized to describe the various disclosed embodiments. In the example network diagram 100, a camera 110, a sensor 120, an alignment system 130, and a user device 140 communicate via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The camera 110 is deployed at a site (not shown) where one or more subjects (such as a target 125 are located. The camera 110 is configured to capture visual content showing the site in forms such as, but not limited to, images, videos, and the like.

The sensor 120 is a position sensor configured to capture sensor signals indicating the position of the sensor 120, for example, as coordinates in three-dimensional space. The sensor 120 may be or may be included in a tag (not depicted separately) and deployed with a subject acting as a target 125.

The alignment system 130 is configured to align visual content (for example, frames of video or images captured by the camera 110) with sensor signals (for example, signals captured by the sensor 120) in order to effectively correlate positions indicated by the sensor signals to portions of the visual content or otherwise to locations shown in the visual content. This, in turn, allows for tracking movement of the target 125 through visual content captured by the camera 110.

The user device 140 may be, but is not limited to, a personal computer, a laptop, a tablet computer, a smartphone, a wearable computing device, or any other device capable of receiving and displaying notifications. The alignment system 130 may send outputs such as, but not limited to, overlays of visual content (for example, overlays indicating positions in 3D space of the target 125 depicted in the visual content), notifications or other messages (for example, messages indicating interactions between the target 125 and one or more non-target subjects, not shown), both, and the like.

It should be noted that FIG. 1 depicts an implementation of various disclosed embodiments, but that at least some disclosed embodiments are not necessarily limited as such. Other deployments, arrangements, combinations, and the like, may be equally utilized without departing from the scope of the disclosure.

FIG. 2 is a flowchart 200 illustrating a method for identifying activities of targets using alignment according to an embodiment. In an embodiment, the method is performed by the alignment system 130.

At S210, a camera is deployed at a site. The site may include one or more subjects (for example, humans, animals, or objects), at least some of which have sensors deployed alongside them. The subjects which have sensors deployed alongside them may be identified as target subjects, or targets, for which their sensor data is to be aligned with images showing the targets.

At S220, communications are established with the sensors deployed alongside the targets at the site. The communications may be established, for example but not limited to, via wireless communications (for example, via Bluetooth or one or more networks).

The sensors may be or may include, but are not limited to, tags. Such a tag is a device including a sensor (also referred to as a tag sensor). Such tags may be wearable or otherwise designed to be deployed with a subject (for example, by being affixed to the subject). In an embodiment, the sensors deployed with the targets include at least position sensors configured to capture locations or otherwise to capture positions of the targets. The positions may be recorded, for example, as coordinates in three-dimensional (3D) space.

At S230, signals are received from the sensors deployed at the site. The signals may be received, for example, via wireless communications by Bluetooth or one or more networks (for example, the network 110). The signals may be received in a form such as, but not limited to, 3D coordinates.

At S240, visual content is received from the camera deployed at the site. The visual content may be or may include images, video, and the like. A video may include a series of frames, where each frame is an image. The received visual content shows the site, and more specifically portions of the visual content show the targets and other non-target subjects at the site. As discussed herein, the visual content is to be aligned with the sensor signals.

At S250, subjects are identified in the visual content. In an embodiment, the identified subjects include one or more targets which have sensors deployed therewith as discussed above. As a non-limiting example, such a target may be a human person wearing a tag, where the tag is a device including a sensor which collects signals indicating locations of the target.

In a further embodiment, the identified subjects include one or more non-target subjects (for example, humans, animals, or objects other than the target human, animals, or objects). As discussed herein, various disclosed embodiments may include identifying interactions between the targets and non-target subjects. Identifying non-target subjects allows for subsequent identification of interactions between the targets and non-target subjects and, in particular, for aligning locations of such interactions to the sensor signals (i.e., where a target was when the target interacted with a non-target subject as shown in the visual content).

At S260, the visual content is aligned to the sensor signals. More specifically, in an embodiment, the visual content is aligned to the sensor signals by transforming the sensor signals from a signal feature space (also referred to as a sensor space or signal space) to a visual content feature space (also referred to as a visual content space). To this end, in a further embodiment, aligning the visual content to the sensor signals includes transforming points defined in a first space into points defined in a second space. More specifically, in a further embodiment, the first space is a space used by the sensors deployed at the site representing positions or otherwise locations of the targets (for example, coordinates in 3D space). In yet a further embodiment, the second space is a space defined with respect to the visual content. As a non-limiting example, the second space may be defined with respect to pixels within the visual content such that points in the second space represent pixels within images.

In an embodiment, the alignment is performed using an affine transformation. As discussed further below with respect to FIG. 3, such an affine transformation balances accuracy of details from the original sensor signals with computational efficiency of performing the transformation. Accordingly, using an affine transformation in order to transform the sensor signals into visual content space allows for performing such transformation using fewer computing resources while preserving certain details in the original sensor signal data such as, but not necessarily limited to, lines and parallelism.

An example process for aligning visual content to sensor signals is described further below with respect to FIG. 3.

At S270, targets are identified in the aligned visual content based on the alignment. In an embodiment, identifying each target in the aligned visual content includes performing visual analysis to visually identify the target within the visual content and correlating instances of the target in the visual content to sensor signals which are aligned with the target. That is, a given target whose movements are represented by a given set of sensor signals (for example, signals from a certain tag) are correlated to instances of a subject shown in the visual content in order to visually identify the target within the visual content.

At S280, movements of the targets are traced based on the sensor signals and the alignment. In an embodiment, tracing the movements of each target includes mapping points or a path of locations which each target occupies with respect to the visual content. That is, the mapping represents locations of the target as it moves, and at least some such locations are correlated to the visual content in order to effectively map the movements of the target through the visual content based on the sensor signals and the alignment.

At S290, interactions between target and non-target subjects are identified. The interactions may be or may include, but are not limited to, talking with a subject, handing an item to a subject, making a gesture toward a subject (for example, a wave or thumbs up), shaking hands with a subject, combinations thereof, and the like. In an embodiment, the interactions are identified based on the alignment of the visual content to the sensor signals and the identification of the non-target subjects within the visual content. In a further embodiment, identifying the interactions further includes correlating positions of the targets with the visual content based on the alignment.

In an embodiment, each interaction is identified based on proximity of the target to a non-target subject. That is, in such an embodiment, an interaction is identified when the distance between a target and a non-target subject is below a predetermined threshold. As a non-limiting example, an interaction between a target and a non-target subject may be identified when a distance between the target and the non-target subject is below 1.5 meters. The distance between a target and a non-target subject may be identified based on visual analysis, for example, by calculating a distance based on a distance in pixels and a known position of the camera relative to the target (i.e., relative to a position of the target correlated to this portion of visual content, where that position is provided via the sensor data which was aligned with this portion of visual content).

In a further embodiment, each interaction is identified based further on visual analysis of behavior of the target, the non-target subject, or both, as represented in the visual content. As a non-limiting example where the interaction of interest is a wave, the interaction may be identified when both the target is within 5 feet proximity to the non-target subject and a motion of the target is identified as a wave using visual analysis of the visual content corresponding to the location at which the target was within 5 feet proximity to the non-target subject. In this manner, interactions may be identified more granularly (for example, by analyzing for specific interactions rather than anytime the target is in proximity to a non-target subject) to allow for identifying certain interactions of interest.

FIG. 3 is a flowchart S260 illustrating a method for aligning visual content to tag signal data according to an embodiment.

At optional S310, sensors may be calibrated. In an embodiment, the sensors to be calibrated include position sensors configured to capture signals indicating positions, for example, in 3D space. In an embodiment, each sensor is calibrated based on one or more reference objects having known positions or otherwise based on one or more known reference points. Signals captured by the sensors may be compared to the respective known positions of the reference objects or reference points, and the sensors may be calibrated such that subsequent signals captured by the sensors would result in the correct outputs for the reference objects or reference points.

It should be noted that various disclosed embodiments may be realized without calibrating the sensors. As discussed below, the affine transformations utilized in accordance with various disclosed embodiments allow for more accurately transforming sensor signals in a position-based feature space (such as a 3D space) into a visual content feature space. Thus, various disclosed embodiments may allow for accurately mapping signals from the signal space into the visual content space without requiring sensor calibration. Moreover, because various disclosed embodiments can be effectively realized without calibration, sensor signals may be mapped into visual content space faster and using fewer computing resources than processes which use calibration. In some implementations, sensor calibration may be utilized in order to further refine or improve accuracy.

At S320, feature spaces are identified. In an embodiment, the feature spaces include a first signal space corresponding to sensor signals and a second visual content space corresponding to visual content. The signal space may be defined, for example, with respect to 3D coordinates. The visual content space may be defined, for example, with respect to pixels within visual content items (for example, frames or images).

At S330, positions of subjects are traced in the visual content space based on one or more portions of visual content (for example, images, frames of videos, etc.).

In an embodiment, tracing the positions of the subjects includes identifying a portion (for example, a set of pixels) of each visual content item (for example, frame or image) among the visual content corresponding to a potential subject. Such portions may be identified based on visual analysis, for example, using computer vision techniques, machine learning, techniques, or a combination thereof. As a non-limiting example, a machine learning model trained to identify certain kinds of subjects (for example, humans or objects of interest) is applied to the visual content items in order to identify portions of the visual content corresponding to subjects.

In a further embodiment, each subject identified in a given visual content item is traced by identifying instances of that subject in other visual content items among the visual content. This allows for identifying the subject in different images, frames, or other visual content items, which in turn allows for correlating movements and activities of the subject to the sensor signals.

At S340, positions of targets are traced in the signal space based on sensor signals captured by sensors deployed at a site (for example, sensors deployed in tags). In an embodiment, tracing the positions of the targets in the signal space includes creating a path for each target, where the path for each target includes a set of points corresponding to positions of the target over time (i.e., positions represented by the sensor signals captured by the sensor deployed with the target).

At S350, transformation is performed on the signals (i.e., the signals defined with respect to the signal space). In an embodiment, the transformation results in a set of second points in the visual content space derived from a first set of points originally in the signal space. The first set of points may be defined as, for example, but not limited to, points in 3D space such as (x,y,z). The second set of points may be defined as, for example, but not limited to, 2D pixel points such as (p,q). The transformation is performed so as to derive the second set of points in a format such as (p,q) from the first set of points in a format such as (x,y,z).

In an embodiment, the transformation is an affine transformation. Such an affine transformation is a transformation which preserves lines and parallelism, but may not preserve Euclidean distances and angles. To this end, in such an embodiment, it is assumed that the relationship between points defined in a format of the first space such as (x,y,z) and points defined in a format of the second space such as (p,q), is an affine relationship. In a further embodiment, the relationship may be expressed as (p,q)=A(x,y,z). In such an expression, A is a value representing the affine transformation. To this end, in yet a further embodiment, S350 includes solving for A.

For such an affine transformation: given two curves (one in visual content space and one in signal space), both parametrized by time, the curve in signal space can be transformed in order to map points of the signal space curve to points of the visual content space curve. To this end, in an embodiment, an affine transformation is applied to the points in the signal space in order to transform the signal space points to the visual content plane, thereby identifying matches between points in the signal space and points in the visual content space. In a further embodiment, approximations to the affine curvature are utilized in order to realize the transformation. Such approximations may include or otherwise utilize semi-differential affine signatures such as, but not limited to, ratios between areas of triangles along the curves.

In this regard, it has been identified that affine transformations utilized in accordance with various disclosed embodiments are less computationally intensive than other transformations which may be utilized to transform tag sensor data into other spaces. In particular, some existing solutions might utilize neural networks or other computationally intensive artificial intelligence (AI) models to transform points from signal space to visual content space, but these solutions increase complexity in both training and inference, thereby increasing use of computing resources. At the same time, certain less computationally intensive transformations may be utilized, but it has been identified that these transformations tend to cause loss of information that may result in low accuracy in resulting mappings. Such low accuracy mappings may fail to capture relevant details among the original signal data and therefore cause discrepancies between the mapping and the actual visual content.

Accordingly, it has been identified that using affine transformations allows for mapping tag sensor data to images in a computationally efficient manner which conserves computing resources while maintaining a level of detail which allows for effectively mapping signals to visual content.

To this end, in an embodiment, the transformation is realized via parameterization of a curve of the points in the signal space. To this end, in a further embodiment, S350 includes determining a parameterization of the curve of the points among the sensor signals. In yet a further embodiment, different portions of the curve are classified.

In this regard, it is noted that, in order to utilize the parameterization of the curve, relative locations of subjects as represented in the sensor signals and the visual content are matched in order to create a mapping between the visual content space and the signal space. Assuming a controlled environment with a single target moving about the site, a one-to-one mapping between each location in the image space and a corresponding location in the visual content space can be established.

However, various disclosed embodiments involve collecting visual content showing multiple targets at the site, each of which may be moving. In such an uncontrolled implementation, matching might be performed for multiple targets represented in the signal space and in the visual content space. To this end, in an embodiment, it is assumed that the curve parameterizations of the signal space and of the visual content space are universal, i.e., such that the same subject in the signal space at a given time would have a curve in time which maps to a curve in time in the visual content space. In other words, in such an embodiment, a universal time axis is used for parameterization of both points in the signal space and points in the visual content space. It is also assumed that the local motion of objects shown in the visual content can be approximated by an affine transformation.

Given the above assumptions regarding universal curve parameterizations and the applicability of affine transformation approximations, subjects can be matched with respect to their projections in the visual content and signal spaces via an alignment process. This alignment process includes solving the local affine transformation (for example, by solving for an affine value). In an embodiment, the affine value is determined locally in the visual content space. In such an embodiment, every local neighborhood in the plane of the sensor feature space (for example, expressed as x, y, and z coordinates) is mapped with an affine transformation (for example, an affine value having 8 parameters) into the plane of the visual content feature space (for example, expressed as p and 1 coordinates).

In an embodiment, the subjects are matched in different feature spaces using semi-differential affine invariant signatures. In yet a further embodiment, one or more machine learning models trained to match signatures accounting for noise and distortions in both feature spaces may be applied in order to improve the accuracy of the matching.

At S360, positions of the targets are mapped to the visual content space based on the transformed signals. In an embodiment, mapping the positions of the targets to the visual content space includes determining visual content coordinates for each of the positions represented in the sensor signals. Such visual content coordinates may be identified with respect to pixels or other portions of visual content and, in particular, a given set of visual content coordinates (i.e., a set representing a given position of a subject shown in the visual content) is defined as a set of pixels or other portion of a given visual content item (for example, a given image or frame of a video).

At S370, positions of the targets within the visual content are determined over time. The positions may be determined to form one or more paths for each target, where the path shows movement of the target defined with respect to the visual content such that the positions indicated by the sensor signals may be correlated to corresponding pixels, groups of pixels, or other portions of the visual content. This allows for tracking movements of the targets within the visual content, which in turn allows for tracking activities of the targets shown in the visual content (for example, tracking at which positions certain activities occurred as indicated in the sensor signals).

FIG. 4 is an example schematic diagram of an alignment system 130 according to an embodiment. The alignment system 130 includes a processing circuitry 410 coupled to a memory 420, a storage 430, and a network interface 440. In an embodiment, the components of the alignment system 130 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the alignment system 130 to communicate with other systems, devices, components, applications, or other hardware or software components, for example as described herein.

It should be understood that the embodiments described herein are not limited to the specific architecture illustrated in FIG. 4, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for visual content alignment, comprising:
 identifying a plurality of subjects in visual content, wherein the visual content is captured by a camera deployed at a site, wherein a position sensor is deployed with a target subject among the plurality of subjects, wherein the position sensor captures a plurality of signals representing a plurality of positions of the target subject at the site;

transforming a plurality of points representing the plurality of positions of the target subject from a first feature space to a second feature space, wherein the first feature space is a feature space of the plurality of signals, wherein the second feature space is a feature space of the visual content, wherein transforming the plurality of points includes using an affine transformation, wherein the plurality of points representing the plurality of positions of the target subject in the first feature space form a curve, wherein transforming the plurality of points further includes classifying a plurality of portions of the curve into a plurality of classifications and mapping the plurality of portions of the curve to the plane of the second feature space based on a parameterization of the curve, wherein the plurality of points is transformed based on the plurality of classifications and the mapping; and mapping the plurality of positions of the target subject represented by the plurality of signals to a plurality of positions within the visual content based on the plurality of points in the second feature space.

2. The method of claim 1, wherein the plurality of points is transformed using a transformation which preserves lines and parallelism.

3. The method of claim 1, wherein transforming the plurality of points further comprises:

solving for an affine value, wherein the plurality of points is transformed based on the affine value.

4. The method of claim 1, wherein the visual content includes a plurality of visual content items, wherein mapping the plurality of positions of the target subject represented by the plurality of signals to the plurality of positions within the visual content further comprises:

determining a set of visual content coordinates for each of the plurality of positions, wherein the set of visual content coordinates of each position is defined with respect to a portion of a visual content item among the plurality of visual content items.

5. The method of claim 1, further comprising:

identifying an interaction between the target subject and another subject of the plurality of subjects shown in the visual content, wherein the interaction is identified with respect to a position among the plurality of positions represented by the plurality of signals.

6. The method of claim 5, wherein the interaction is identified based on a distance between the target subject and the other subject below a threshold.

7. The method of claim 5, wherein the visual content includes a plurality of visual content items, further comprising:

identifying the target subject in at least one visual content item of the plurality of visual content items, wherein the interaction is identified based on the at least one visual content item.

8. A non-transitory computer-readable medium having stored thereon instructions for causing a processing circuitry to execute a process, the process comprising:

identifying a plurality of subjects in visual content, wherein the visual content is captured by a camera deployed at a site, wherein a position sensor is deployed with a target subject among the plurality of subjects, wherein the position sensor captures a plurality of signals representing a plurality of positions of the target subject at the site;

transforming a plurality of points representing the plurality of positions of the target subject from a first feature space to a second feature space, wherein the first feature space is a feature space of the plurality of signals, wherein the second feature space is a feature space of the visual content, wherein transforming the plurality of points includes using an affine transformation, wherein the plurality of points representing the plurality of positions of the target subject in the first feature space form a curve, wherein transforming the plurality of points further includes classifying a plurality of portions of the curve into a plurality of classifications and mapping the plurality of portions of the curve to the plane of the second feature space based on a parameterization of the curve, wherein the plurality of points is transformed based on the plurality of classifications and the mapping; and mapping the plurality of positions of the target subject represented by the plurality of signals to a plurality of positions within the visual content based on the plurality of points in the second feature space.

9. A system for visual content alignment, comprising:

a processing circuitry; and a memory, the memory containing instructions that, when executed by the processing circuitry, configure the system to:

identify a plurality of subjects in visual content, wherein the visual content is captured by a camera deployed at a site, wherein a position sensor is deployed with a target subject among the plurality of subjects, wherein the position sensor captures a plurality of signals representing a plurality of positions of the target subject at the site;

transform a plurality of points representing the plurality of positions of the target subject from a first feature space to a second feature space, wherein the first feature space is a feature space of the plurality of signals, wherein the second feature space is a feature space of the visual content, wherein transforming the plurality of points includes using an affine transformation, wherein the plurality of points representing the plurality of positions of the target subject in the first feature space form a curve, wherein transforming the plurality of points further includes classifying a plurality of portions of the curve into a plurality of classifications and mapping the plurality of portions of the curve to the plane of the second feature space based on a parameterization of the curve, wherein the plurality of points is transformed based on the plurality of classifications and the mapping; and map the plurality of positions of the target subject represented by the plurality of signals to a plurality of positions within the visual content based on the plurality of points in the second feature space.

10. The system of claim 9, wherein the plurality of points is transformed using a transformation which preserves lines and parallelism.

11. The system of claim 9, wherein the system is further configured to:

solve for an affine value, wherein the plurality of points is transformed based on the affine value.

12. The system of claim 9, wherein the visual content includes a plurality of visual content items, wherein the system is further configured to:

determine a set of visual content coordinates for each of the plurality of positions, wherein the set of visual content coordinates of each position is defined with respect to a portion of a visual content item among the plurality of visual content items.

13. The system of claim 9, wherein the system is further configured to:

identify an interaction between the target subject and another subject of the plurality of subjects shown in the visual content, wherein the interaction is identified with respect to a position among the plurality of positions represented by the plurality of signals.

14. The system of claim 13, wherein the interaction is identified based on a distance between the target subject and the other subject below a threshold.

15. The system of claim 13, wherein the visual content includes a plurality of visual content items, wherein the system is further configured to:

identify the target subject in at least one visual content item of the plurality of visual content items, wherein the interaction is identified based on the at least one visual content item.

* * * * *